US012668080B2

(12) United States Patent (10) Patent No.: US 12,668,080 B2

Briggs et al. (45) Date of Patent: Jun. 30, 2026

(54) SINGLE ACTION BRAKE AND SWIVEL LOCK FOR CASTER

(71) Applicant: Colson Group Holdings, LLC, Oakbrook Terrace, IL (US)

(72) Inventors: William James John Briggs, Bridgman, MI (US); David Paul Beatty, Stevensville, MI (US); David L. Pruitt, Jr., Benton, AR (US)

(73) Assignee: Colson Group Holdings, LLC, Oakbrook Terrace, IL (US)

( * ) Notice: Subject to any disclaimer, the term of this patent is extended or adjusted under 35 U.S.C. 154(b) by 0 days.

(21) Appl. No.: 19/012,327

(22) Filed: Jan. 7, 2025

(65) Prior Publication Data

US 2025/0229574 A1 Jul. 17, 2025

Related U.S. Application Data

(60) Provisional application No. 63/621,170, filed on Jan. 16, 2024.

(51) Int. Cl.
B60B 33/00 (2006.01)
B60B 33/02 (2006.01)
(52) U.S. Cl.
CPC ...... B60B 33/0086 (2013.01); B60B 33/0018 (2013.01); B60B 33/0021 (2013.01);
(Continued)
(58) Field of Classification Search
CPC ............ B60B 33/0018; B60B 33/0021; B60B 33/0039; B60B 33/025; B60B 33/0028;

B60B 33/0055; B60B 33/0094; B60B 33/0049; B60B 33/0057; B60B 33/0068; B60B 33/0081; B60B 33/0084;
(Continued)

(56) References Cited

U.S. PATENT DOCUMENTS 1,671,774 A 5/1928 McIntosh
3,911,525 A 10/1975 Haussels
(Continued)

FOREIGN PATENT DOCUMENTS

EP 3484719 B1 * 8/2020 ........... B60B 33/025
GB 2457787 A 9/2009
(Continued)

*Primary Examiner* — Chuck Y Mah

(74) *Attorney, Agent, or Firm* — Dorsey & Whitney LLP

(57) ABSTRACT

A caster has a mount, a housing, a horn rotatable relative to the housing about a swivel axis, spaced apart forks on lateral sides of the horn, a wheel assembly disposed between the forks, a swivel locking ring disposed in the horn, and a braking member having a bridging portion and first and second plunger portions projecting away from the bridging portion. The bridging portion has a tooth rack extending outward. The first and second plunger portions project from the bridging portion in a direction opposite the tooth rack and have brake blocks. A brake lever arm is pivotally connected with the housing and movable between engaged and disengaged positions. An engagement pin extends through the housing and the interior of the horn and has first and second ends. The first end is connected with the brake lever arm, and the second end abuts the braking member bridging portion.

20 Claims, 13 Drawing Sheets

(52) U.S. Cl.
CPC ...... *B60B 33/0039* (2013.01); *B60B 33/0068*
(2013.01); *B60B 33/021* (2013.01); *B60B*
*33/025* (2013.01)

(58) Field of Classification Search
CPC . B60B 33/0092; B60B 33/021; B60B 33/023;
B60B 33/0042; B60B 33/0073; B60B
33/0078; B60B 33/0086; B60B 37/10;
B60B 2200/222; B60B 2200/242; B60B
2900/531; A61G 7/0528; F16D 49/00;
F16D 65/42; F16D 2121/14; F16D
2125/32

See application file for complete search history.

(56) References Cited

U.S. PATENT DOCUMENTS

| | | | |
|---|---|---|---|
| 4,349,937 | A | 9/1982 | Fontana |
| 5,184,373 | A | 2/1993 | Lange |
| 5,232,071 | A | 8/1993 | Kawanabe |
| 6,360,851 | B1 | 3/2002 | Yang |
| 6,532,624 | B1 * | 3/2003 | Yang ................... B60B 33/0021 16/35 R |
| 6,584,641 | B1 | 7/2003 | Milbredt |
| 6,725,501 | B2 | 4/2004 | Harris et al. |
| 6,834,746 | B1 * | 12/2004 | Lin ...................... B60B 33/021 16/35 R |
| 7,861,370 | B2 | 1/2011 | Chu |
| 8,205,297 | B2 | 6/2012 | Fallshaw et al. |
| 8,365,354 | B1 * | 2/2013 | Fan ........................ B60B 33/04 16/35 R |
| 8,418,315 | B1 | 4/2013 | Lin et al. |
| 8,484,802 | B1 | 7/2013 | Lin et al. |
| 8,522,397 | B1 | 9/2013 | Tsai |
| 8,714,314 | B1 | 5/2014 | Chen |
| 8,904,598 | B2 | 12/2014 | Waitz |
| 8,991,007 | B2 | 3/2015 | Tsai |
| 9,038,786 | B2 | 5/2015 | Lin |
| 9,266,393 | B2 | 2/2016 | Yeo |
| 9,302,544 | B2 | 4/2016 | Jie |
| 9,387,723 | B2 | 7/2016 | Beatty |
| 9,481,206 | B2 | 11/2016 | Block et al. |
| 9,603,764 | B2 | 3/2017 | Turturro et al. |
| 11,065,913 | B2 | 7/2021 | Molozis |
| 11,161,372 | B1 * | 11/2021 | Lin ....................... B60B 33/021 |
| 11,173,747 | B2 | 11/2021 | Renno |
| 2011/0119864 | A1 * | 5/2011 | Minowa .............. B60B 33/0092 16/45 |
| 2013/0097804 | A1 | 4/2013 | Weichbrodt |
| 2014/0238784 | A1 * | 8/2014 | Yeo ........................ B60B 33/021 188/1.12 |
| 2015/0096845 | A1 * | 4/2015 | Lin ....................... B60B 33/021 16/35 R |
| 2019/0160869 | A1 | 5/2019 | Stoehr et al. |
| 2021/0061003 | A1 | 3/2021 | Molozis |
| 2022/0227171 | A1 * | 7/2022 | Saito ...................... B60B 33/00 |
| 2024/0198726 | A1 * | 6/2024 | Beatty ................ B60B 33/0086 |
| 2024/0375435 | A1 * | 11/2024 | Jie .......................... B60B 33/021 |

FOREIGN PATENT DOCUMENTS

| | | | |
|---|---|---|---|
| JP | 2005178654 | A * | 7/2005 |
| WO | 2002020285 | A1 | 3/2002 |

* cited by examiner

20

30

22

24

40

28

46

60

70

62

SINGLE ACTION BRAKE AND SWIVEL LOCK FOR CASTER

RELATED APPLICATION DATA

This application claims priority benefit to U.S. provisional application Ser. No. 63/621,170 filed Jan. 16, 2024, the disclosure of which is incorporated by reference herein.

BACKGROUND AND SUMMARY

The present disclosure is directed to a caster with an actuator configured to provide actuation of a brake lock and swivel lock with a single actuation. For instance, in one configuration, the caster has a brake lever arm that allows the brake lock and swivel lock to be engaged or disengaged simultaneously. The swivel lock portion of the caster may have two configurations depending upon the application. In one of the configurations, the swivel lock may be configured to engage in a manner such that the caster may be in one angular orientation relative to its swivel axis. In the other of the configurations, the swivel lock may be configured to engage in a manner such that the caster may be in one of a plurality of angular orientations relative to its swivel axis.

DETAILED DESCRIPTION

Figure 1:
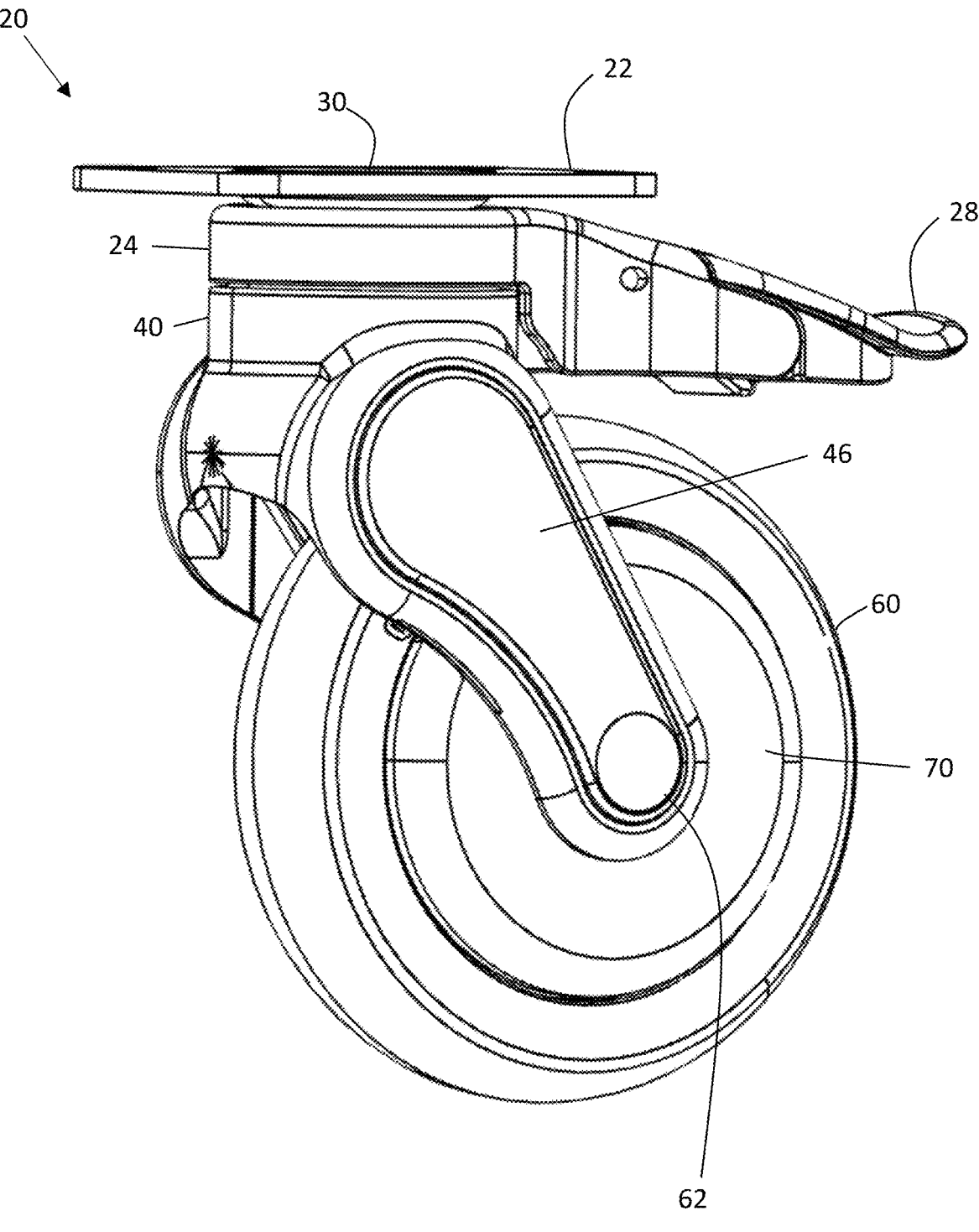
FIG. 1 is a perspective view of an exemplary caster.
Figure 2:
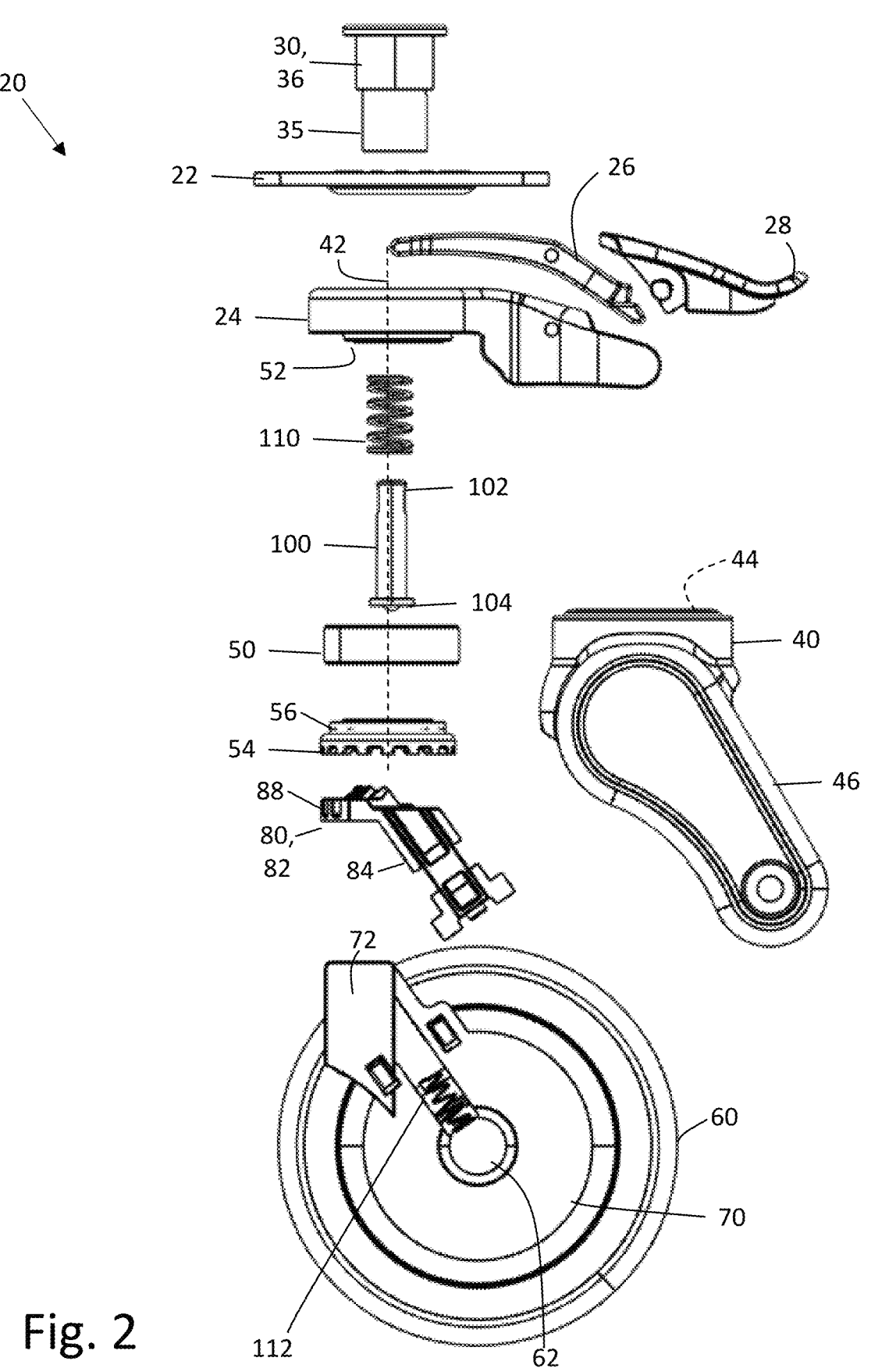
FIG. 2 is an exploded view of the caster of FIG. 1.
Figure 3:
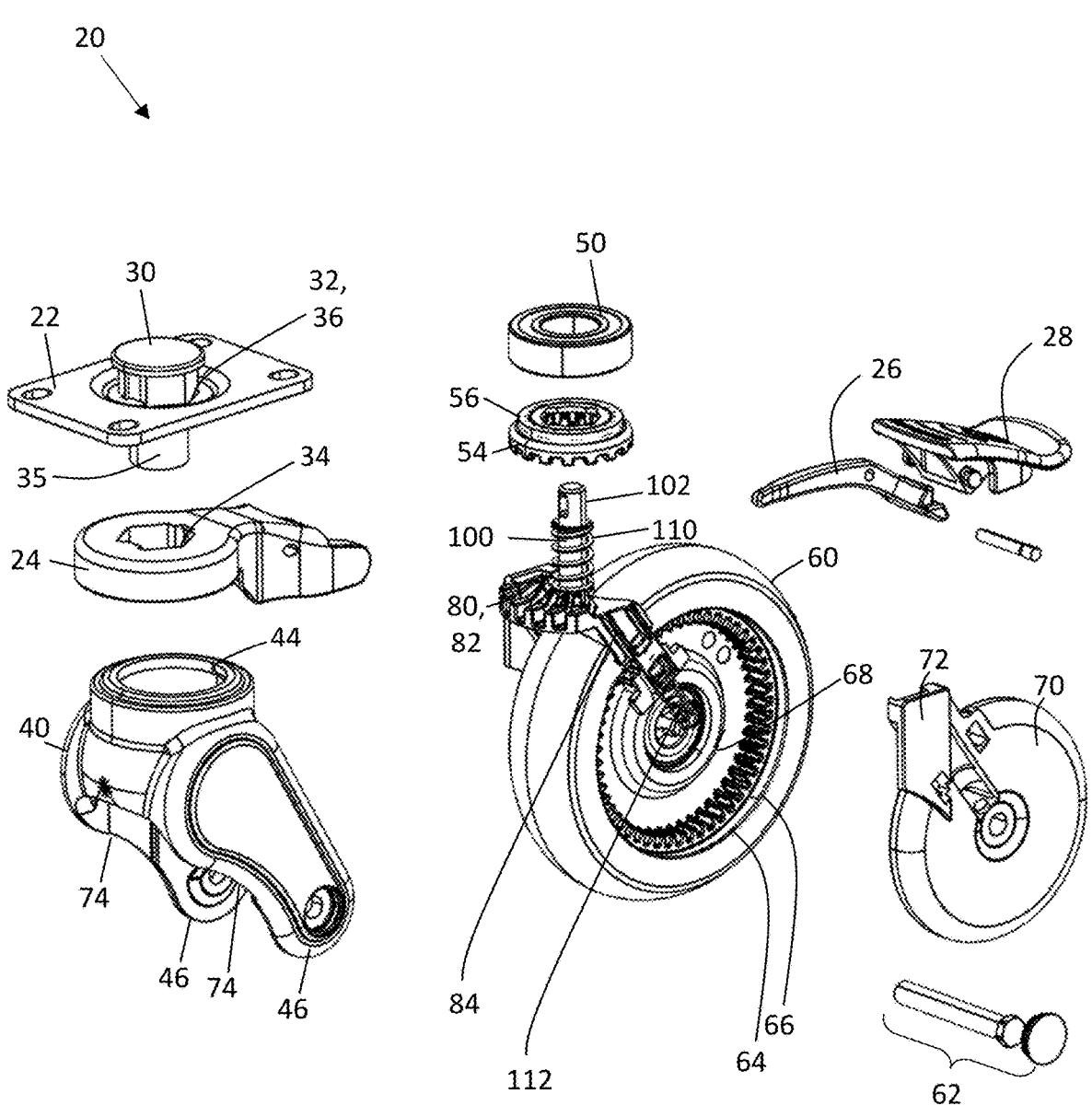
FIG. 3 is an alternate exploded view of the caster of FIG. 1.
Figure 4:
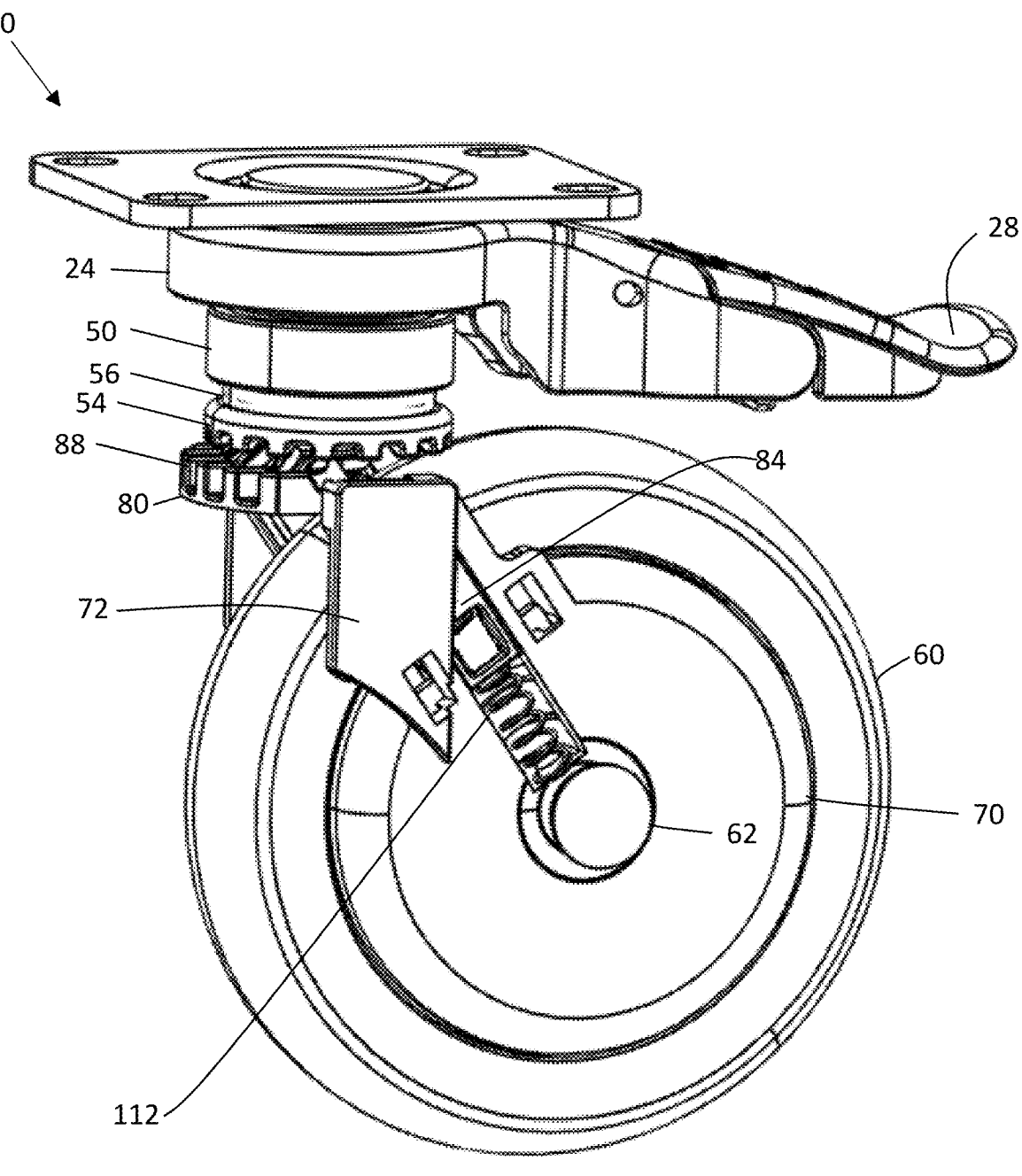
FIG. 4 is a perspective of the caster of FIG. 1 with a horn of the caster removed to show additional detail.
Figure 5:
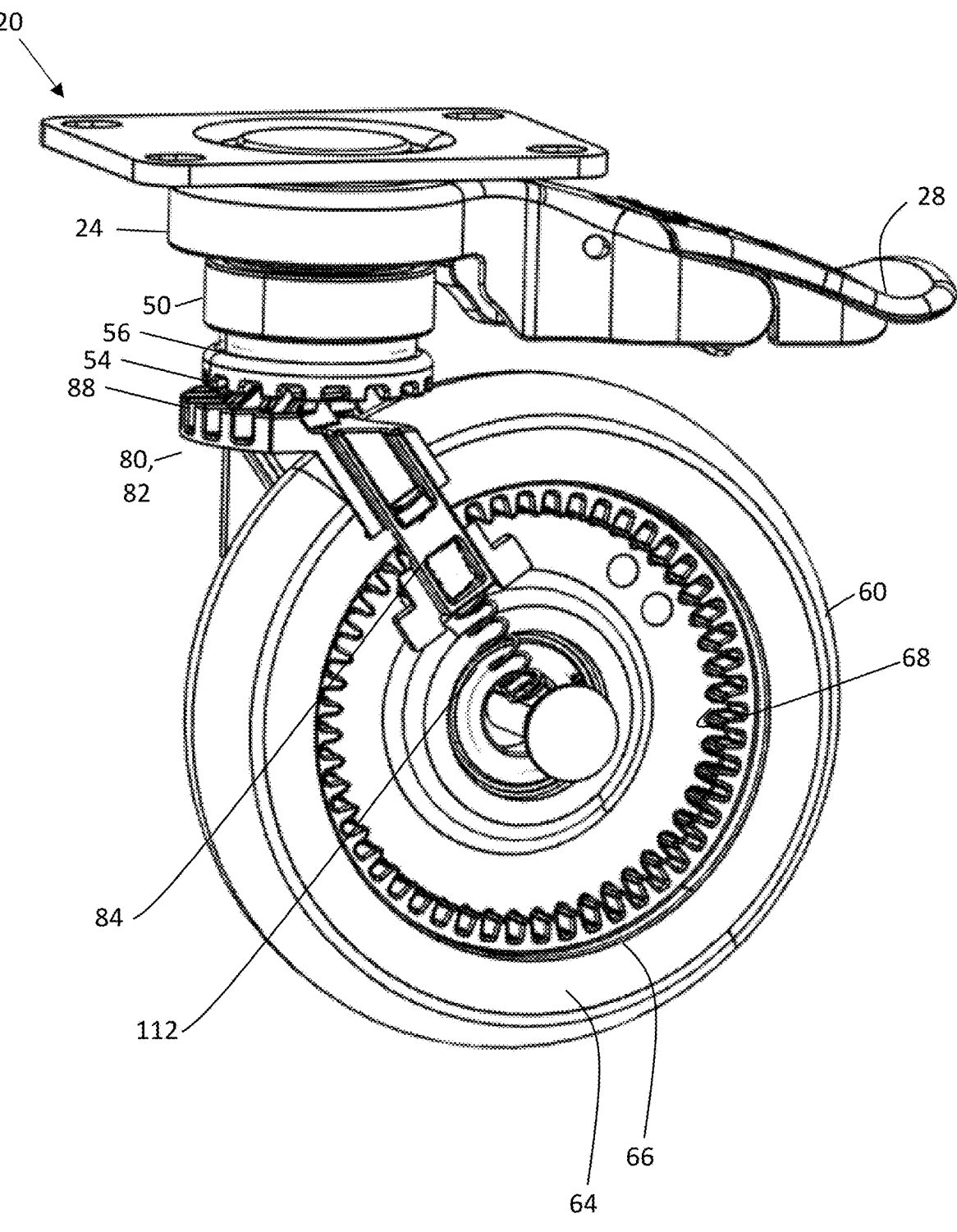
FIG. 5 is a perspective of the caster of FIG. 4 with a thread guard of the caster removed to show additional detail.
Figure 6:
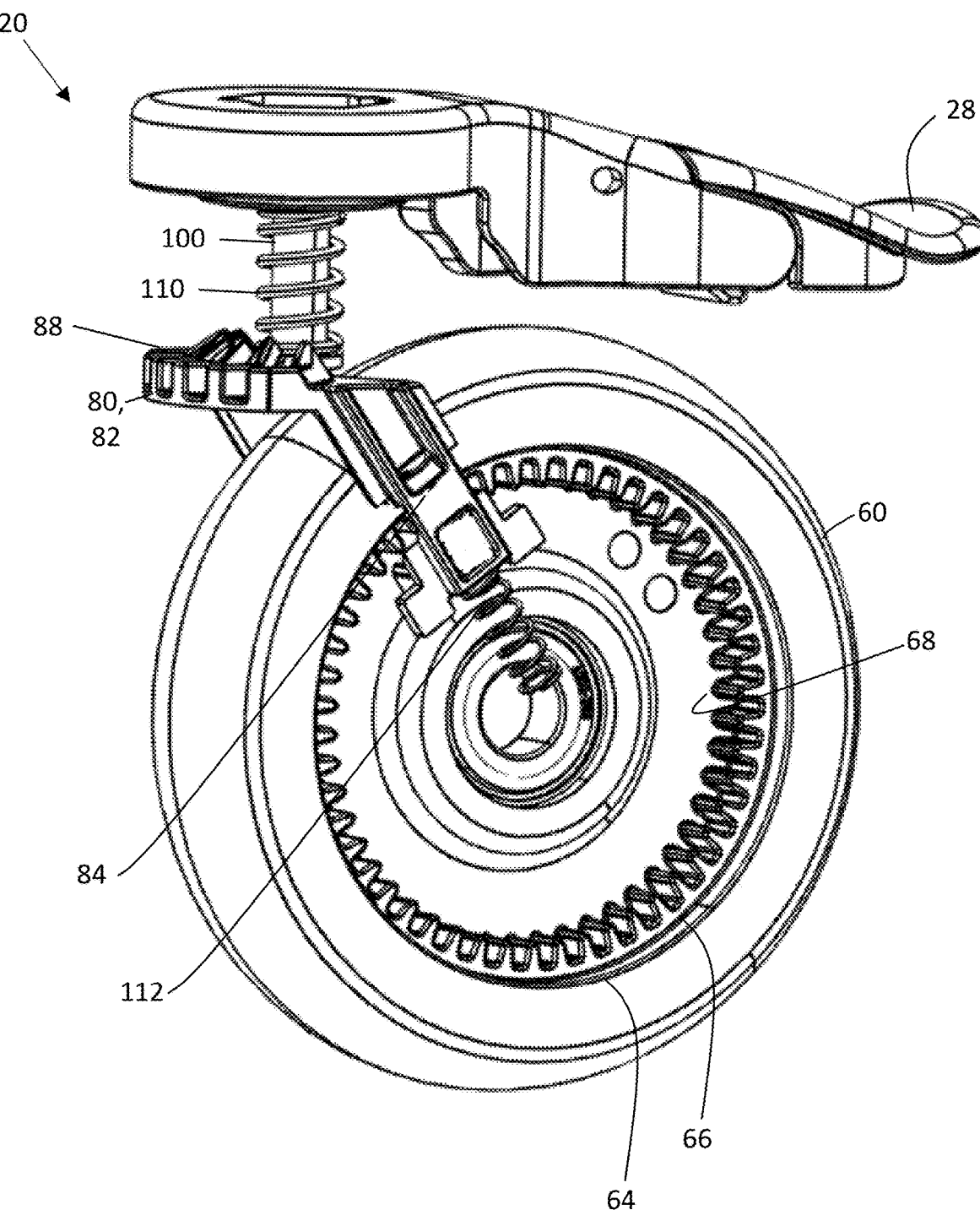
FIG. 6 is a perspective of the caster of FIG. 5 with a top plate, a king pin, a housing, a bearing, a swivel locking ring, and an axle assembly of the caster removed to show additional detail.
Figure 7:
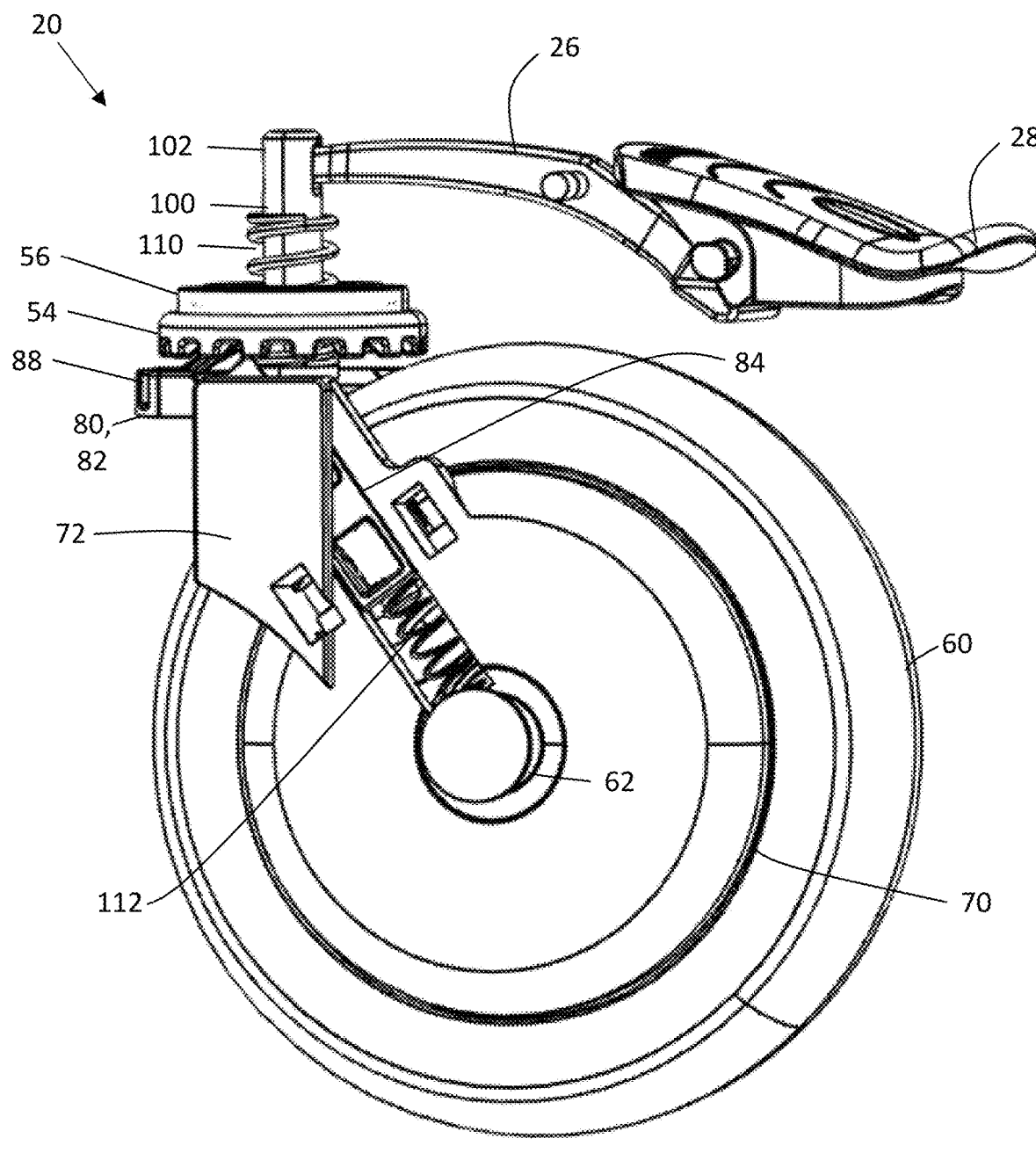
FIG. 7 is a perspective of the caster of FIG. 4 with a top plate, a king pin, a housing, and a bearing of the caster removed to show additional detail.
Figure 8:
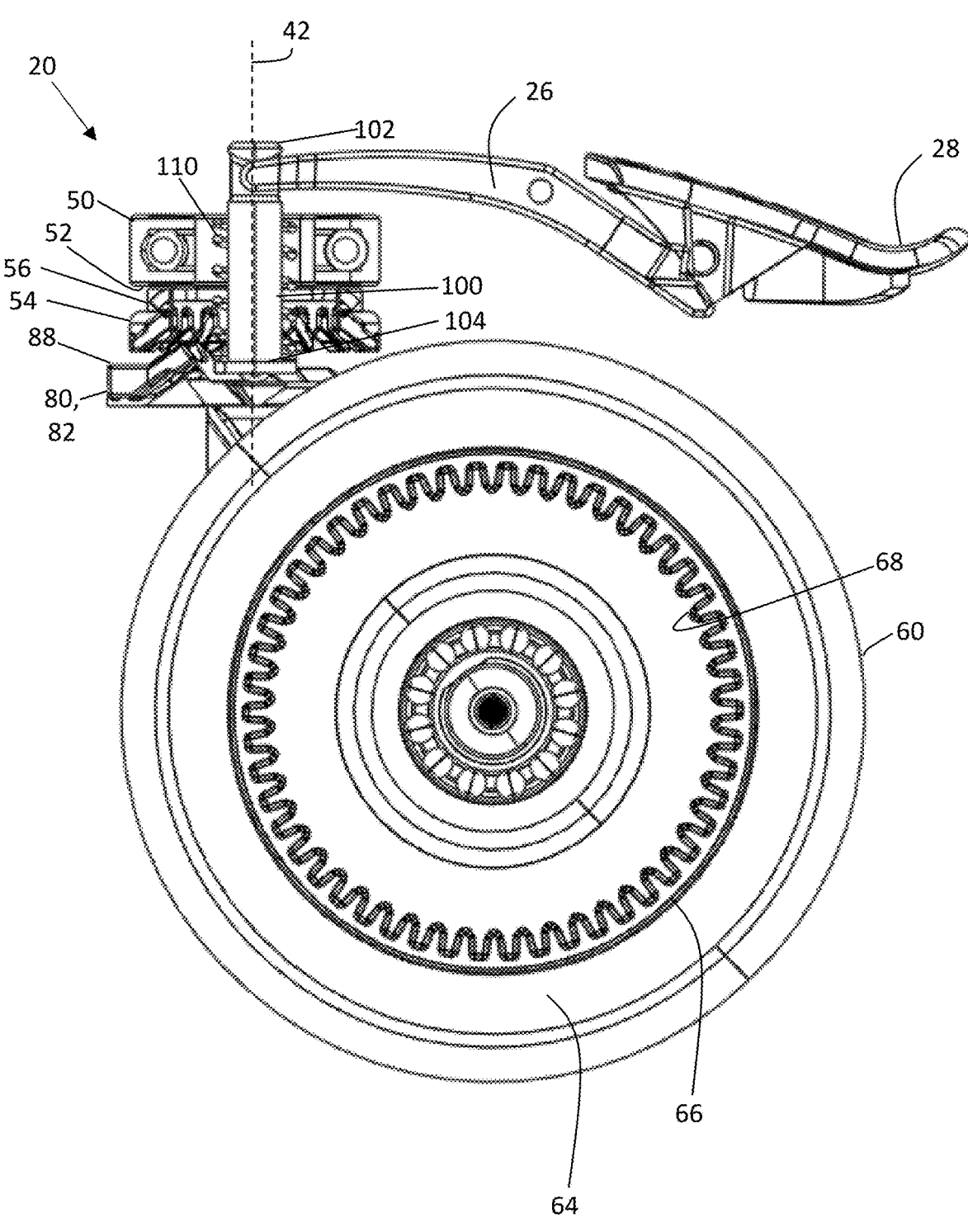
FIG. 8 is a side cross-sectional view of the caster of FIG. 1 with a top plate, a king pin, a housing, and a horn removed to show additional detail.

The exemplary caster 20 is configured to provide actuation of a brake lock and swivel lock with a single actuation.

Referring to FIGS. 1-7, the caster 20 has a mount 22 that is adapted and configured to attach the caster to an object to be moved with the caster. The mount 22 may be a top plate as shown or may be a stem. The mount 22 may be configured as needed for attachment to the object to be moved with the caster. For instance, in the configuration of the mount 22 as a top plate, the top plate may have a plurality of holes configured to receive mechanical fasteners to attach the caster to the object. In the configuration of a stem, the stem may be threaded for attachment to the object, or may be knurled for a press fit with the object.

The caster may have a housing 24. The housing 24 may support a brake lever arm 26 and brake pedal 28. The brake lever arm 26 and the brake pedal 28 may be pivotally connected to the housing 24. The brake pedal 28 and brake lever arm 26 may operatively drive actuation of the brake lock and swivel lock of the caster. In the alternative, the housing may support a hollow stem that includes an actuator that is driven by an operator for driving actuation of the brake lock and the swivel lock. The housing 24 may be operatively connected to the mount 22. For instance, as shown in the drawings, a king pin 30 may connect the housing 24 and the top plate 22 together. In one example, the top plate 22 and housing 30 may each have a hole 32,34 with a matching geometry, and the king pin may have a shoulder 36 with an outer periphery that matches the geometry of the hole of the top plate and the housing, thereby allowing the king pin 30 to lock the top plate 22 to the housing 24. In such a configuration, the housing 24 and the top plate 22 are locked together as a single assembly, and the remainder of the caster 20 below the housing and the top plate may swivel relative to the housing and the top plate. Accordingly, the brake pedal 28 extending from the housing 24 may be in the same orientation as the housing and the top plate and the remainder of the caster below the housing may swivel relative to the housing, the top plate, and the brake pedal.

The caster 20 may have a horn 40 that is adapted and configured to rotate relative to the housing 24 about a swivel axis 42. The horn 40 may have an interior portion 44 and spaced apart forks 46 on lateral sides of the horn. The interior portion 44 of the horn may include a bearing 50 that facilitates the relative rotation between the horn and the housing. For instance, an outer race of the bearing 50 may be captured by a surface in the interior portion 44 of the horn 40, and an inner race of the bearing may abut a bearing surface 52 of the housing 24 that projects into the interior of the horn. The inner race of the bearing 50 may also be engaged by the king pin 30. The king pin 30 may have a surface 34 below its shoulder 36 that projects into the interior portion 44 of the horn 40 and engages the inner race of the bearing 50. In the interior portion 44 of the horn 40, a swivel locking ring 54 may be disposed. The swivel locking ring 54 may be fixed in position in the interior portion 44 of the horn, and may have an upper portion 56 that contacts a thrust surface of the inner race of the bearing 50.

The caster 20 may have a wheel assembly 60 disposed between the forks 46 of the horn 40. The wheel assembly 60 may comprise a tread bonded to a core to form the wheel assembly. The wheel assembly 60 may be operatively connected to the forks 46 with an axle assembly 62 for relative rotation with the forks 46. The wheel assembly 60 may have a side face 64 with an annular recess 66 formed in the side face. The annular recess 66 of the side face 64 may have a brake ring 68 extending around an inner diameter of the annular recess. The brake ring 68 may be formed in the side recess. The brake ring 68 may be formed in the side face 64 from the same material as the wheel assembly, or the brake ring may be mounted to an inner diameter of the annular recess 66. The brake ring 68 may include a plurality of equiangular spaced teeth that project radially inward toward the center of the wheel assembly. The wheel assembly 60 may have an annular recess 66 with a brake ring 68 extending around an inner diameter of each side face 64 of the wheel assembly, as shown in the drawings. In the alternative, two wheels may be arranged side by side between forks 46 of the horn 40 to form the wheel assembly 60, and the outer side face of each wheel may have the annual recess with the brake ring. Thread guards 70 may be arranged adjacent to the side faces 64 of the wheel 60 (or the outer side face of a dual wheel arrangement). The thread guard 70 may cover the annular recess 66. The thread guard 70 may be arranged between the outer side faces 64 of the wheel assembly 60 and the fork 46 of the horn 40. The thread guard 70 may interlock with the forks 46 of the horn 40 so as to prevent the thread guards 40 from slipping and being rotated when the wheel assembly is braked. For instance, the thread guard 70 may have a raised profile 72 that fits with a recess formed in the forks 46 of the horn 40. The recess in the fork 46 may be configured to allow the thread guard 70 to be pushed upward in the drawings into the interlocking position with the forks 46 of the horn 40.

The caster 20 may be provided with a braking member 80. The braking member 80 may have a bridging portion 82, and first and second plunger portions 84,86 that project away from the bridging portion 82. The bridging portion 82 may be disposed within the interior portion 44 of the horn 40. The first and second plunger portions 84,86 may be surrounded by the forks 46 of the horn, and may be surrounded by the thread guards 70. The bridging portion 82 may have an upper region with a tooth rack 88 that extends outward from the bridging portion 82. The first plunger portion 84 may project from the bridging portion 82 in a direction opposite the tooth rack 88 on one side on the braking member 80 and along the first side face 64 of the wheel assembly 60. The second plunger portion 86 may extend from the bridging portion 82 in a direction opposite the tooth rack 88 on the other side of the braking member 80 opposite of the first plunger portion 84 and along the second side face 64 of the wheel assembly 60. The first plunger portion 84 may have a distal end with a brake block 90 that is configured to engage the brake ring 68 of the annular recess 66 of the side face 64, and the second plunger portion 86 may have a distal end with a brake block 90 that is configured to engage the brake ring 68 of the annular recess of the opposite side face.

Figure 9:
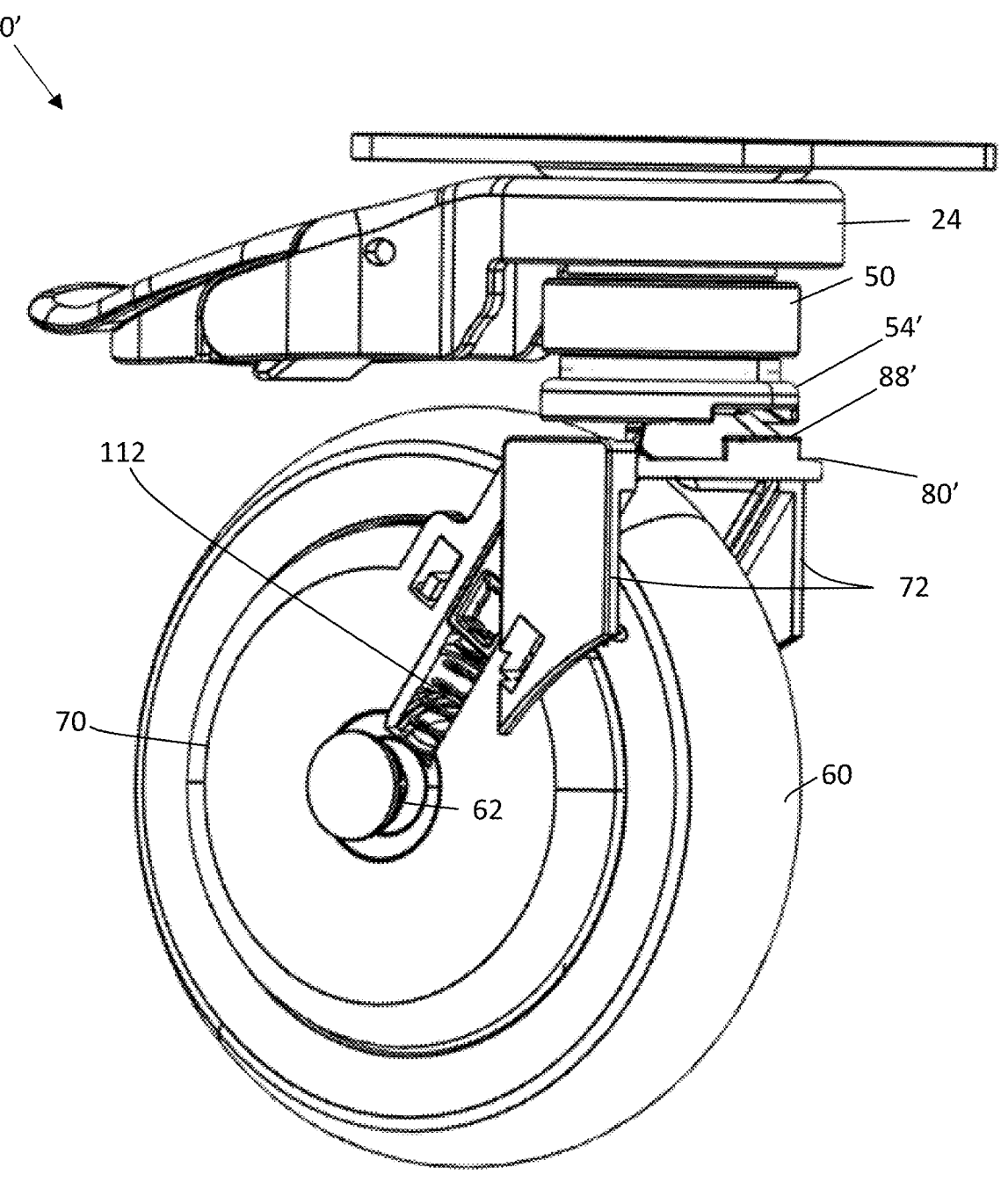
FIG. 9 is an alternate embodiment of the caster of FIG. 1 with a horn of the caster removed to show additional detail of the swivel locking ring and braking member.
Figure 10:
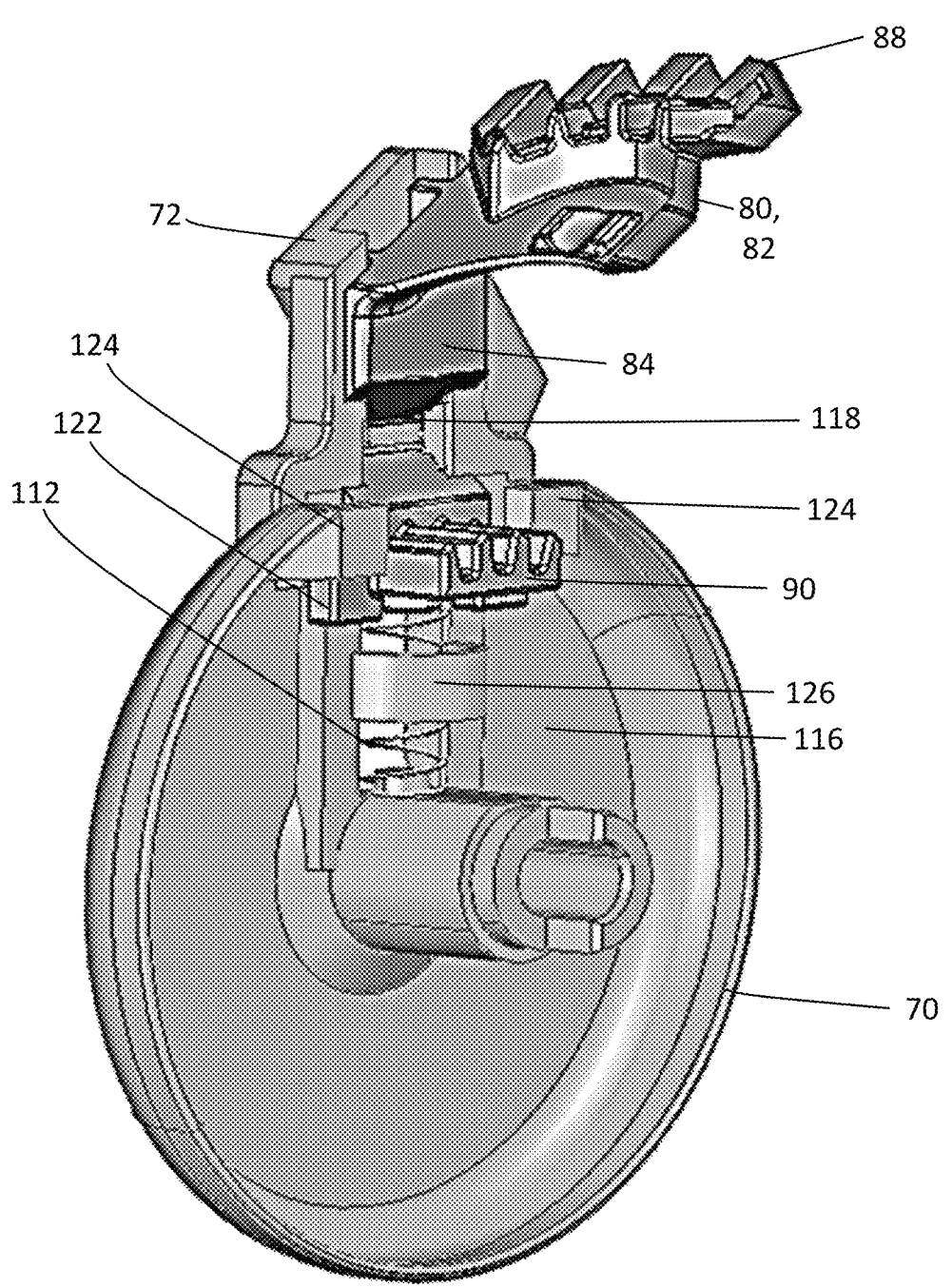
FIG. 10 is a perspective view of a thread guard with the braking member in cross section.
Figure 11:
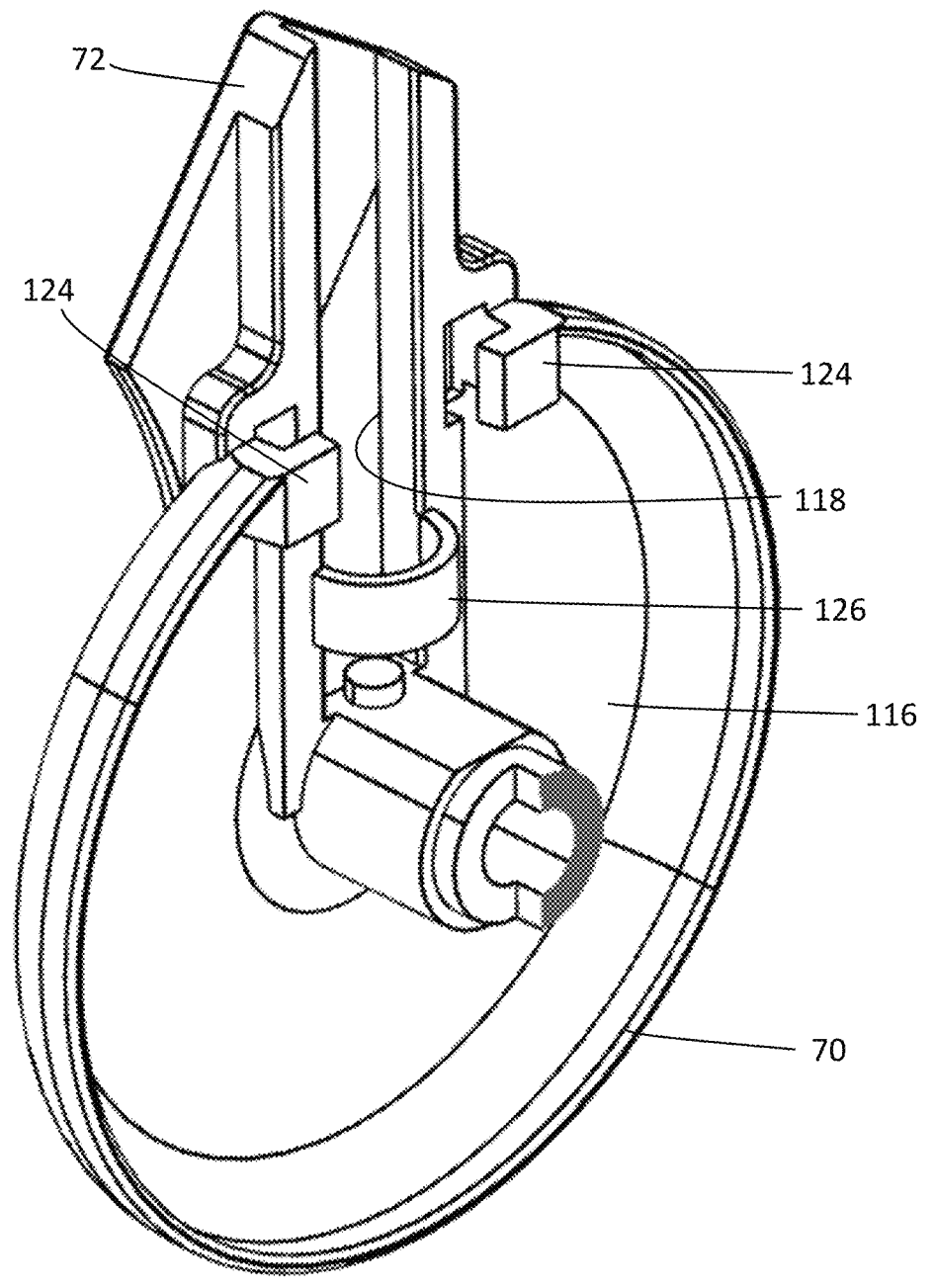
FIG. 11 is a perspective view of the thread guard without the braking member.
Figure 12:
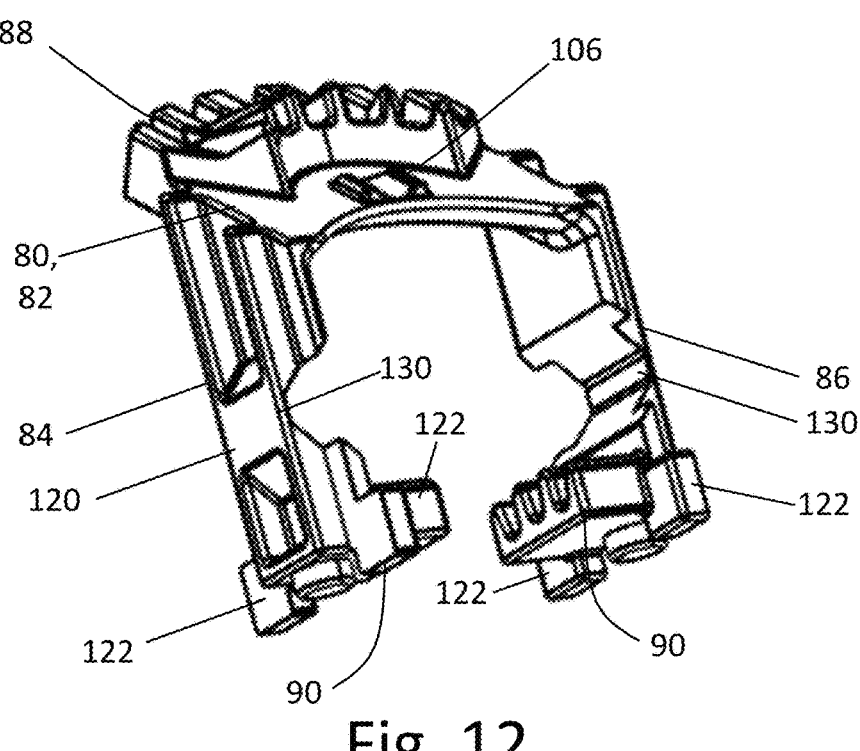
FIG. 12 is a perspective view of the braking member of the caster of FIG. 1.
Figure 13:
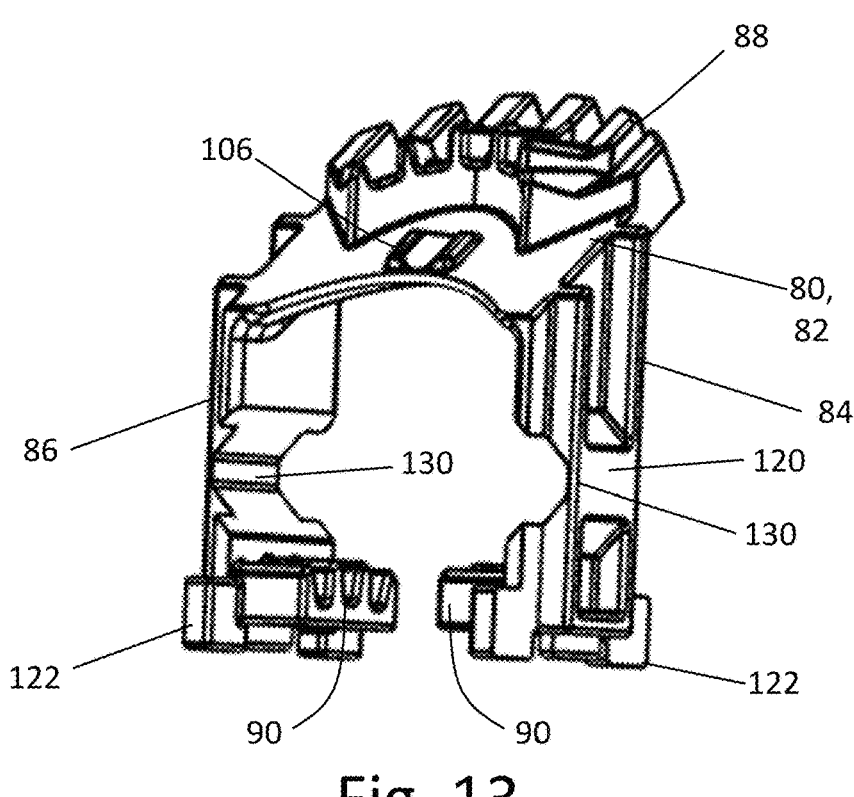
FIG. 13 is an alternate perspective view of the braking member of the caster of FIG. 1.
Figure 14:
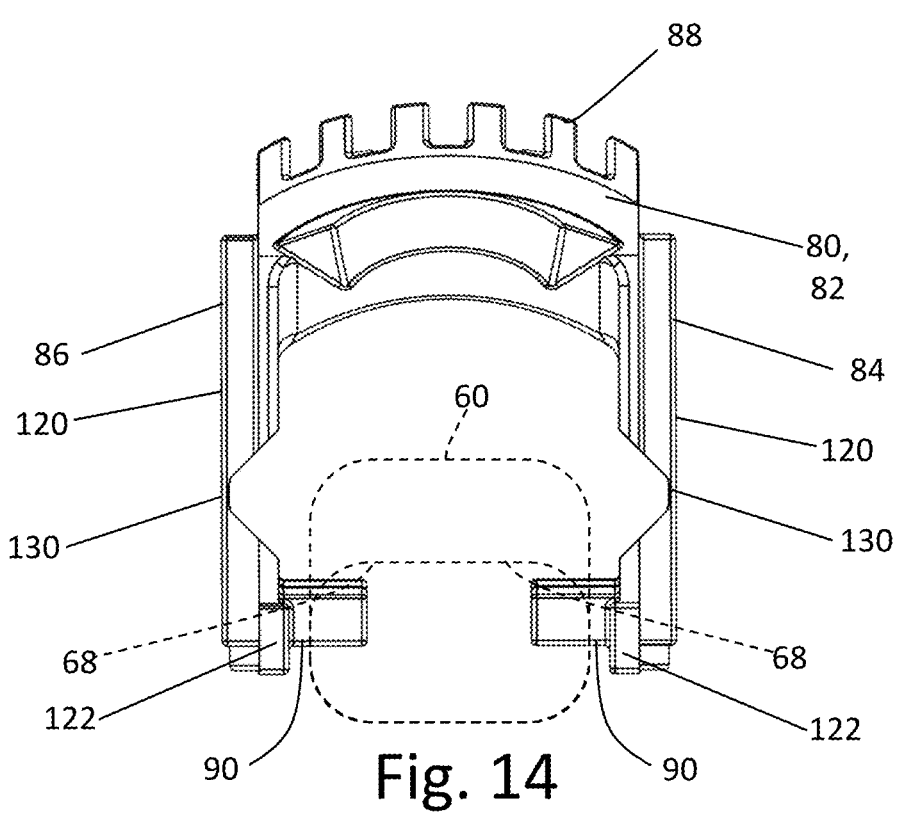
FIG. 14 is a front view of the braking member of the caster of FIG. 1 with brake blocks of the braking member pivoted in position to engage a brake ring of a wheel assembly of the caster, which is shown in phantom.
Figure 15:
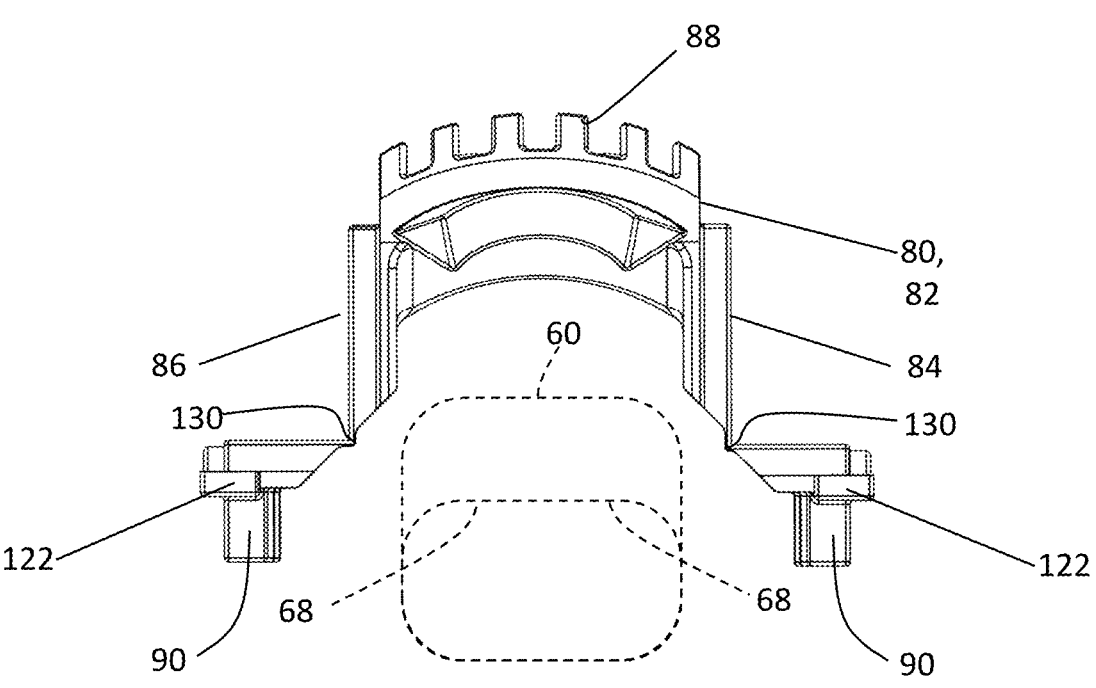
FIG. 15 is a front view of the braking member of the caster of FIG. 13 prior to the brake blocks of the braking member being pivoted into position to engage the brake ring of the wheel assembly of the caster, which is shown in phantom.

In one aspect of the swivel lock, the tooth rack 88 of the braking member 80 may comprise a plurality of teeth, and the swivel locking ring 54 may comprise a plurality of teeth. Accordingly, in this configuration, the plurality of teeth of the tooth rack 88 of braking member 80 and the plurality of teeth of the swivel locking ring 54 may be configured to enable engagement in a plurality of angular orientations or positions of the horn 40 relative to the housing 24 about the swivel axis 42. In the alternative, for instance, as shown in FIG. 9, the tooth rack 88' of the braking member 80' may be a single tooth and the swivel locking ring 54' may comprise a single detent. Accordingly, in this configuration, the single tooth of the tooth rack 88' and the single detent of the swivel locking ring 54' enable engagement in a single angular orientation of the horn 40 relative to the housing 24 about the swivel axis 42. In yet another alternative, the tooth rack 88' of the braking member 80' may be a single tooth as shown in FIG. 9, and the swivel locking ring may comprise two detents, for instance, 180 degrees apart. Accordingly, in this configuration, the single tooth of the tooth rack 88' and may engage either detent of the swivel locking ring to enable engagement in bi-directional angular orientation of the horn 40 relative to the housing 24 about the swivel axis 42. In another aspect, the same braking member 80 as shown in FIGS. 1-7 with a tooth rack 88 having a plurality of teeth may be used with either a swivel locking ring 54 having a plurality of teeth or a swivel locking ring 54' with one detent. As discussed above, the swivel locking ring 54 with the plurality of teeth may engage with the plurality of teeth of tooth rack 88 of the braking member 80 to provide a plurality of angular orientations of the horn 40 relative to the housing 24 about the swivel axis 42, and the swivel locking ring 54' with the single detent may be configured to receive the entirety of the plurality of teeth of the tooth rack 88 of the braking member 80 to provide a single angular orientation of the horn 40 relative to the housing 24 about the swivel axis 24. Thus, the caster 20 may be produced in a standard format, and the braking member and swivel locking ring may be manufactured with a similar size, shape and form but with a different tooth pattern, depending upon the desired application.

The caster 20 may have an engagement pin 100 that extends through the housing 24 and the interior portion 44 of the horn 40. A centerline of the engagement pin may be coaxial with the king pin 30. A centerline of the engagement pin 100 may be coaxial with the swivel axis 42. The engagement pin 100 may have first and second ends 102, 104. The first end 102 of the engagement pin 100 may be operatively connected with the brake lever arm 26. The second end 104 of the engagement pin may be adapted and configured to abut the bridging portion 82 of the braking member 80. The first end 102 of the engagement pin 100 may be formed with a hole that cooperates with a distal end of the brake lever arm 26, so movement of the distal end of the brake lever arm may directly control motion of the engagement pin, that is, up and down in the drawings. A portion of the engagement pin 100, including the first end 102 of the engagement pin, may travel within a hollow center portion of the king pin 30. The hollow center portion of the king pin 30 may be configured to slidingly engage the engagement pin 100. The king pin 30 may also have a slot configured to accommodate the distal end of the brake lever arm 26 and its connection to the first end 102 of the engagement pin 100. Another portion of the engagement pin 100, including the second end 104 of the engagement pin 100, may extend through the center of the bearing 50 and the center of the swivel locking ring 54 so as to bear on the bridging portion 82 of the braking member 80. The bridging portion 82 of the braking member 84 may have a recess 106 that cooperates with the second end 104 of the engagement pin 100.

In one aspect of the caster, the brake lever arm 26 may be positionable between an engaged position and a disengaged position. The brake lever arm 26 may be positioned with the brake pedal 28. Accordingly, (i) when the brake lever arm 26 moves to the engaged position, the brake lever arm 26 moves the engagement pin 100 in a manner such that the braking member 80 moves to a position where the tooth rack 88 of the bridging portion 82 of the braking member engages the swivel locking ring 54, and the brake block 90 of each of the first and second plunger portions 84,86 of the braking member engages the respective braking ring 68 of the annular recesses 66 of the first and second side faces 64 of the wheel assembly 60; and (ii) when the brake lever arm 26 moves to the disengaged position, the brake lever arm 26 moves the engagement pin 100 in a manner such that the braking member 80 moves to a position where the tooth rack

88 of the bridging portion 82 of the braking member 80 is spaced from the swivel locking ring 54, and the brake block 90 of each of the first and second plunger portions 84,86 of the braking member 80 is spaced from the respective braking ring 68 of the annular recesses 66 of the first and second side faces 64 of the wheel assembly 60.

In another aspect of the caster, for instance, when the caster does not include a brake lever arm, and for instance, an actuator disposed in a stem of the caster may be actuated with an operator to engage and disengage the locking feature of the caster, the engagement pin may be movable between the engaged and disengaged position via the actuator. The engagement pin may be configured to move with the braking member between the engaged position and the disengaged position. Accordingly, (i) when the engagement pin moves to the engaged position, the engagement pin moves the braking member to a position where the tooth rack of the bridging portion of the braking member engages the swivel locking ring and the brake block of each of the first and second plunger portions of the braking member engages the respective braking ring of the annular recesses of the first and second side faces of the wheel assembly; and (ii) when the engagement pin moves to the disengaged position, the engagement pin moves the braking member to a position where the tooth rack of the bridging portion of the braking member is spaced from the swivel locking ring and the brake block of each of the first and second plunger portions of the braking member is spaced from the respective braking ring of the annular recesses of the first and second side faces of the wheel assembly.

In yet another aspect of the caster, the braking member may be movable between engaged and disengaged positions. Accordingly, (i) when the braking member moves to the engaged position, the tooth rack of the bridging portion of the braking member engages the swivel locking ring and the brake block of each of the first and second plunger portions of the braking member engages the respective braking ring of the annular recesses of the first and second side faces of the wheel assembly; and (ii) when the braking member moves to the disengaged position, the tooth rack of the bridging portion of the braking member is spaced from the swivel locking ring and the brake block of each of the first and second plunger portions of the braking member is spaced from the respective braking ring of the annular recesses of the first and second side faces of the wheel assembly.

To facilitate movement between the engaged and disengaged positions, whether in the engaged and disengaged positions of the brake lever arm, engagement pin, and/or brake member as described above, the caster may include an engagement pin spring 110. The engagement pin spring 110 may be adapted and configured to bias the engagement pin 100 in a manner to position the tooth rack 88 of the bridging portion 82 of the braking member 80 away from the swivel locking ring 54, and the brake block 90 of each of the first and second plunger portions 84,86 of the braking member 80 away from the respective braking ring 68 of the annular recesses 66 of the first and second side faces 64 of the wheel assembly 60. In one aspect, the engagement pin spring 110 may be a coil spring disposed around the engagement pin 100. One end of the coil spring may bear against an internal shoulder of the hollow interior of the king pin 30. The opposite end of the coil spring may bear against a rim projecting outward at the second end 104 of the engagement pin 100. The engagement pin spring 110 may be under compression in both the engaged position and disengaged position. The engagement pin spring 110 may be compressed to a first length when the engagement pin 100 is in the engaged position, and the engagement pin spring may be compressed to a second length when the engagement pin is in the disengaged position, where the first length is less than the second length.

To further facilitate movement between the engaged and disengaged positions, whether in the engaged and disengaged positions of the brake lever arm, engagement pin, and/or brake member as described above, the caster may include a spring 112 for the first and/or second plunger portion 84,86. The spring 112 of the first plunger portion 84 may be adapted and configured to bias the first plunger portion 84 of the braking member 80 in a manner to position the tooth rack 88 of the bridging portion 82 of the braking member into engagement with the swivel locking ring 54, and the brake block 90 of the first plunger portion 84 of the braking member 80 into engagement with the braking ring 68 of the annular recess 66 of the first side face 64 of the wheel assembly. The spring 112 of the second plunger portion 86 may be adapted and configured to bias the second plunger portion 86 of the braking member 80 in a manner to position the tooth rack 88 of the bridging portion 82 of the braking member 80 into engagement with the swivel locking ring 54, and the brake block 90 of the second plunger portion 86 of the braking member 80 into engagement with the braking ring 68 of the annular recess 66 of the second side face 64 of the wheel assembly 60. The spring 112 of the first plunger portion 84 may be adapted and configured to bias the first plunger portion 84 so that the bridging portion 82 of the braking member 80 bears against the engagement pin 100 in the direction to move the engagement pin 100 to the engaged position. The spring 112 of the second plunger portion 86 may be adapted and configured to bias the second plunger portion 86 so that the bridging portion 82 of the braking member 80 bears against the engagement pin 100 in the direction to move the engagement pin to the engaged position. Preferably, the springs 112 of the first and second plunger portions 84,86 have a spring force which is insufficient to move the engagement pin 100 and overcome the spring force of the engagement pin spring 110. When the engagement pin 100 moves from the disengaged position to the engaged position, the engagement pin moves out of the way and allows the springs 112 of the first and second plunger portions to push the braking member 80 up into engagement with the swivel locking ring 54. The spring 112 of the first plunger portion 84 may be a coil spring. The spring 112 of the second plunger portion 86 may be a coil spring.

The thread guard 70 adjacent to the respective side face 64 of the wheel assembly 60 may have features that cooperate with the plunger portion 84,86 such that the respective plunger portion is slidingly engageable with the thread guard. For instance, the thread guard 70 may have an inner surface 116 facing the side face 64 of the wheel assembly 60. The inner facing surface 116 of the thread guard 70 may have one or more grooves and/or slots 118. Outer sides 120 of the plunger portions 84,86 may be shaped to cooperate with and are slidingly received in the grooves or slot 118 of the inner facing surface 116 of the thread guard 70. The plunger portion 84,86 and the inner facing surface 116 of the thread guard may also have flanges 122,124 that cooperate to retain the plunger portion 84,86 in sliding engagement with the thread guard 70. The inner facing surface 116 of the thread guard may also have a collar 126 adapted and configured to retain the spring 112 of the respective plunger portion 84,86. One or both of the thread guards may be similarly constructed, as described above.

The first plunger portion 84 may have a midsection between its brake block 90 and the bridging portion 82 with a hinge 130, for instance, a live hinge. The second plunger portion 86 may have a midsection between its brake block 90 and the bridging portion 82 with a hinge 130, for instance, a live hinge. During assembly of the caster, the plunger portions 84,86 of the braking member 80 may be folded about their respective hinges 130 to allow the brake block to be positioned in the annular recess 66 of the side face 64 of the wheel assembly 60 and around the outer tread of the wheel assembly. Also, plunger portions 84,86 may be folded about their respective hinges 130 to allow the plunger portion to be assembled with sliding engagement with the thread guard 70, and to allow the cooperating features 118,120,122,124 of the tread guard and respective plunger portion to be engaged. For instance, during assembly, the plunger portions 84,86 may be folded about their respective hinges 130 to allow manipulation of the protruding ribs 120 of the plunger portions 84,86 into the grooves/slots 118 of the respective thread guards 70 and engagement of the flanges 122,124.

The embodiments were chosen and described in order to best explain the principles of the disclosure and their practical application to thereby enable others skilled in the art to best utilize said principles in various embodiments and with various modifications as are suited to the particular use contemplated. As various other modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A caster comprising:
a mount adapted and configured to attach the caster to an object to be moved;
a horn adapted and configured to rotate relative to a housing about a swivel axis, the horn having an interior portion and spaced apart forks on lateral sides of the horn;
a wheel assembly disposed between the forks and being operatively connected to the forks with an axle assembly for relative rotation with the forks, the wheel assembly having first and second outer side faces with an annular recess formed in each side face, the annular recess of each side face having a brake ring extending around an inner diameter of the annular recess;
a swivel locking ring disposed in the horn;
a braking member having a bridging portion and first and second plunger portions projecting away from the bridging portion, the bridging portion having a tooth rack extending outward from the bridging portion, the first plunger portion projecting from the bridging portion in a direction opposite the tooth rack on one side on the braking member and along the first outer side face of the wheel assembly, the second plunger portion extending from the bridging portion in a direction opposite the tooth rack on another side of the braking member opposite the first plunger portion and along the second side outer side face of the wheel assembly, the first plunger portion having a brake block, the second plunger portion having a brake block, the braking member being moveable between an engagement position and disengagement position;
an engagement pin extending into the horn interior, the engagement pin having an end abutting the bridging portion of the braking member in the interior of the horn;
wherein when the braking member moves to the engaged position, the tooth rack of the bridging portion of the braking member engages the swivel locking ring and the brake block of each of the first and second plunger portions of the braking member engages the respective braking ring of the annular recesses of the first and second side outer side faces of the wheel assembly; and
wherein when the braking member moves to the disengaged position, the tooth rack of the bridging portion of the braking member is spaced from the swivel locking ring and the brake block of each of the first and second plunger portions of the braking member is spaced from the respective braking ring of the annular recesses of the first and second outer side faces of the wheel assembly.

2. The caster of claim 1 wherein the engagement pin moves with the braking member between the engaged position and the disengaged position.

3. The caster of claim 1 wherein the engagement pin is operatively connected with a brake pedal.

4. The caster of claim 1 further comprising an engagement pin spring, the engagement pin spring being adapted and configured to bias the engagement pin in a manner to move the braking member to the disengaged position.

5. The caster of claim 4 wherein the engagement pin spring is a coil spring.

6. The caster of claim 5 wherein the engagement pin spring is compressed to a first length when the braking member is in the engaged position, the engagement pin spring is compressed to a second length when the braking member is in the disengaged position, the first length is less than the second length.

7. The caster of claim 1 further comprising a spring of the first plunger portion, the spring of the first plunger portion being adapted and configured to bias the first plunger portion of the braking member in a manner to move the braking member to the engaged position.

8. The caster of claim 1 further comprising a thread guard disposed adjacent to the first outer side face of the wheel assembly and covering the annular recess of the first outer side face of the wheel assembly.

9. The caster of claim 8 wherein the thread guard and the first plunger portion have cooperating features such that the first plunger portion is slidingly engageable with the thread guard.

10. The caster of claim 8 wherein one of the thread guard and the first plunger portion have flanges and the other of the thread guard and first plunger portion have tabs that are configured to receive the flanges such that the first plunger portion is slidingly engageable with the thread guard.

11. The caster of claim 8 wherein the thread guard has a collar adapted and configured to retain a spring of the first plunger portion.

12. The caster of claim 1 further comprising a spring of the second plunger portion, the spring of the second plunger portion being adapted and configured to bias the second plunger portion of the braking member in a manner to move the braking member to the engaged position.

13. The caster of claim 1 further comprising a thread guard disposed adjacent to the second side outer side face of the wheel assembly and covering the annular recess of the second outer side face of the wheel assembly.

14. The caster of claim 13 wherein the thread guard and the second plunger portion have cooperating features such that the second plunger portion is slidingly engageable with the thread guard.

15. The caster of claim 13 wherein one of the thread guard and the second plunger portion have flanges and the other of the thread guard and second plunger portion have tabs that are configured to receive the flanges such that the second plunger portion is slidingly engageable with the thread guard.

16. The caster of claim 13 wherein the thread guard has a collar adapted and configured to retain a spring of the second plunger portion.

17. The caster of claim 1 wherein the swivel locking ring has a plurality of spaced apart teeth extending around the swivel locking ring that are adapted and configured to engage the tooth rack of the bridging portion in a plurality of orientations.

18. The caster of claim 1 wherein the swivel locking ring is adapted and configured to engage the tooth rack of the bridging portion in no more than two different orientations.

19. The caster of claim 1 wherein the swivel locking ring has a detent that is adapted and configured to engage the tooth rack of the bridging portion in a single orientation.

20. The caster of claim 1 wherein at least one of the first plunger portion and the second plunger portion has a midsection between the brake block and the bridging portion, the midsection has a hinge.

\* \* \* \* \*